(12) United States Patent
Hu et al.

(10) Patent No.: US 9,760,810 B2
(45) Date of Patent: Sep. 12, 2017

(54) ELECTRONIC CARD CONNECTOR ASSEMBLY HAVING IMPROVED TERMINALS TO AVOID SCUFFING

(71) Applicant: FOXCONN INTERCONNECT TECHNOLOGY LIMITED, Grand Cayman (KY)

(72) Inventors: Gang Hu, Kunshan (CN); Guo-Dong Gu, Kunshan (CN); Jin-Guo Qiu, Kunshan (CN); Yong-Qi Wang, Kunshan (CN); Tien-Chieh Su, New Taipei (TW)

(73) Assignee: FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 0 days.

(21) Appl. No.: 15/150,405

(22) Filed: May 9, 2016

(65) Prior Publication Data

US 2016/0254606 A1     Sep. 1, 2016

Related U.S. Application Data

(63) Continuation-in-part of application No. 14/688,171, filed on Apr. 16, 2015, now Pat. No. 9,490,557.

(30) Foreign Application Priority Data

Jul. 1, 2014  (CN) ............ 2014 1 0306722
May 7, 2015  (CN) ............ 2015 1 0228279

(51) Int. Cl.
*H01R 24/00*   (2011.01)
*G06K 13/08*   (2006.01)
(Continued)

(52) U.S. Cl.
CPC ............ *G06K 13/08* (2013.01); *H01R 12/57* (2013.01); *H01R 13/245* (2013.01); *H01R 12/714* (2013.01)

(58) Field of Classification Search
CPC ...... G06K 13/08; H01R 13/245; H01R 12/57; H01R 12/714; H01R 13/6272;
(Continued)

(56) References Cited

U.S. PATENT DOCUMENTS 7,967,640 B2    6/2011  Hashimoto et al.
9,490,557 B2 *  11/2016  Wang .................... G06K 13/08
(Continued)

FOREIGN PATENT DOCUMENTS

CN    201075484 U    6/2008
CN    201207470 Y    3/2009
(Continued)

*Primary Examiner* — Javaid Nasri
(74) *Attorney, Agent, or Firm* — Wei Te Chung; Ming Chieh Chang

(57) ABSTRACT

An electronic card connector, defining an insertion direction, an ejection direction, and a transverse direction perpendicular to the insertion direction, includes an insulative housing and a number of terminals retained in the insulative housing. The terminals include a row of first contacts disposed along the insertion direction. Each first contact has a first affixed portion and a first contacting portion located at a peak therein. Each of the first contacts extends along the transverse direction. The first contacting portions of the neighboring first contacts are located offset along the insertion direction. The first contacting portions and associated first affixed portions of the first contacts are distanced differently in the transverse direction.

20 Claims, 8 Drawing Sheets

(51) Int. Cl.
*H01R 12/57* (2011.01)
*H01R 13/24* (2006.01)
*H01R 12/71* (2011.01)

(58) Field of Classification Search
CPC .. H01R 12/722; H01R 13/633; H01R 13/627; H01R 12/72
USPC .............. 439/157, 159, 160, 357, 629, 630; 235/441
See application file for complete search history.

(56) References Cited

U.S. PATENT DOCUMENTS

| | | |
|---|---|---|
| 2015/0050840 A1 | 2/2015 | Tsuji et al. |
| 2015/0270630 A1 | 9/2015 | Lu et al. |
| 2016/0006173 A1 | 1/2016 | Wang et al. |

FOREIGN PATENT DOCUMENTS

| | | |
|---|---|---|
| CN | 201708318 U | 1/2011 |
| CN | 202855990 U | 4/2013 |
| CN | 103280647 A | 9/2013 |
| CN | 103280668 U | 9/2013 |
| CN | 103296518 A | 9/2013 |
| CN | 203192973 | 9/2013 |
| CN | 203193084 U | 9/2013 |
| CN | 203826608 | 9/2014 |
| CN | 204103095 U | 1/2015 |
| CN | 104505623 | 4/2015 |
| CN | 204304030 U | 4/2015 |
| JP | 2001135427 A | 5/2001 |
| JP | 2009295496 | 12/2009 |
| JP | 2010135137 A | 6/2010 |
| JP | 2011165560 A | 8/2011 |
| JP | 2013206663 A | 10/2013 |
| TW | 490098 U | 6/2002 |

* cited by examiner

US 9,760,810 B2

ELECTRONIC CARD CONNECTOR ASSEMBLY HAVING IMPROVED TERMINALS TO AVOID SCUFFING

BACKGROUND OF THE INVENTION

1. Field of the Invention

The present invention relates generally to an electronic card connector, and more particularly to an electronic card connector assembly having improved terminals to avoid scuffing.

2. Description of Related Arts

Japan Patent No. 2009295496 discloses a card connector including a housing, a number of terminals, and a metal shell. Each terminal includes a contacting portion, a rectangular frame portion, and an inclined supporting portion between the frame portion and the contacting portion. The supporting portion extends in a direction perpendicular to a card insertion direction. U.S. Pat. No. 7,967,640 discloses a card connector designed for working with a Subscriber Identity Module (SIM) card. Contacts of the connector each include a contact portion, two elastic deformation portions, and a terminal portion. The two elastic deformation portions are coupled together so as to substantially form an isosceles triangle shape with a vertex angle θ1 at a vertex corresponding to the contact portion. The contacting portions located in a row are arranged in a line. The contacts are apt to damage from scuffing by pads of the card during card insertion.

U.S. Patent Application Publication No. 2015/0270630 discloses a card connector including a number of contacts and a base. The contacts are triangular and arranged in two rows along a transverse direction. The neighboring contacts located in a row extend along opposite directions, i.e., are alternating. Each contact has a connecting portion, a pair of elastic portions extending from two sides of the connecting portion, and a contacting portion located at a peak of the two elastic portions. The contacting portions, viewed along a card-insertion direction, may be offset alternatingly.

An electronic card connector assembly having improved terminals is desired.

SUMMARY OF THE INVENTION

Accordingly, an object of the present invention is to provide an electronic card connector assembly having improved terminals to prevent damage to contacting portions thereof.

To achieve the above object, an electronic card connector, defining an insertion direction, an ejection direction, and a transverse direction perpendicular to the insertion direction, comprising: an insulative housing; and a plurality of terminals retained in the insulative housing, the terminals having a plurality of first contacts disposed along the insertion direction, each first contact having a pair of first affixed portions and a first contacting portion located at a peak therein, the first contacts located in a row along the insertion direction extending along a same direction, the first contacting portions of the neighboring first contacts located offset along the insertion direction, the first contacting portions and the corresponding first affixed portions of the first contacts defining different transverse distances.

DETAILED DESCRIPTION OF THE PREFERRED EMBODIMENT

Figure 1:
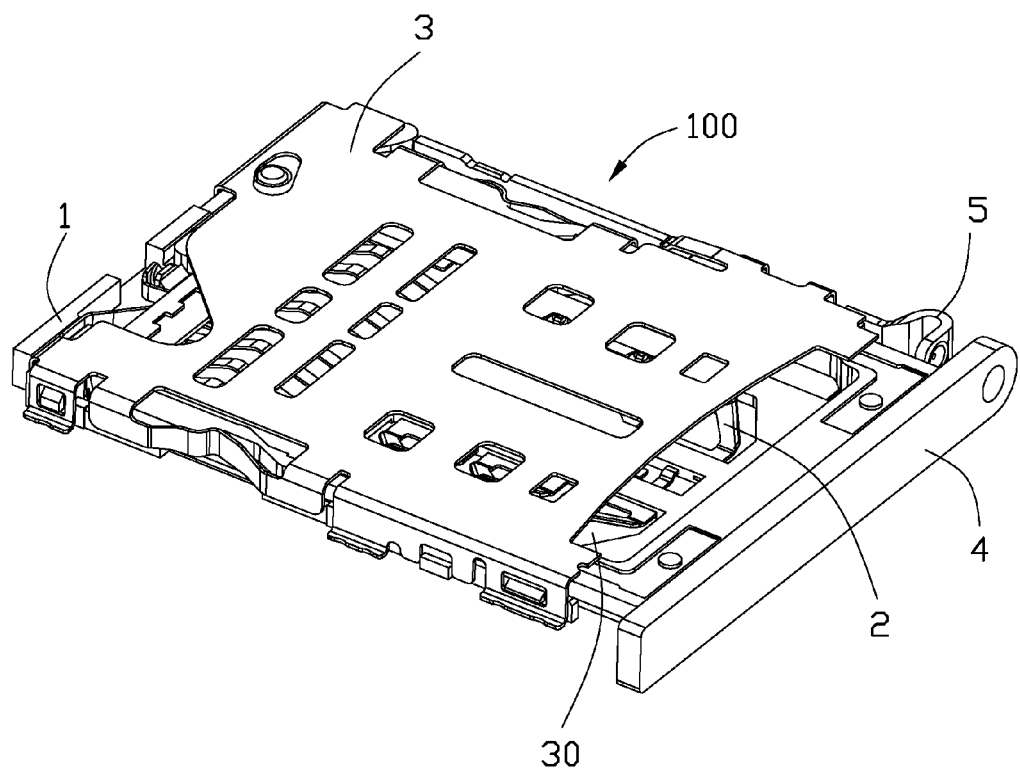
FIG. 1 is a perspective, assembled view of an electronic card connector in a first embodiment.

Reference will now be made in detail to the preferred embodiment of the present invention.

Referring to FIGS. 1 to 6, an electronic card connector 100 in a first embodiment of the present invention includes an insulative housing 1, a number of terminals 2 retained in the insulative housing 1, a metal shell 3 shielding the housing 1 and forming a receiving cavity 30 therebetween, a tray 4 movably received in the receiving cavity 30, and an ejector 5 located at one side of the receiving cavity 30. For convenience, the electronic connector 100 defines an insertion direction, an ejection direction, and a transverse direction perpendicular to the insertion direction and the ejection direction in FIG. 1.

Figure 2:
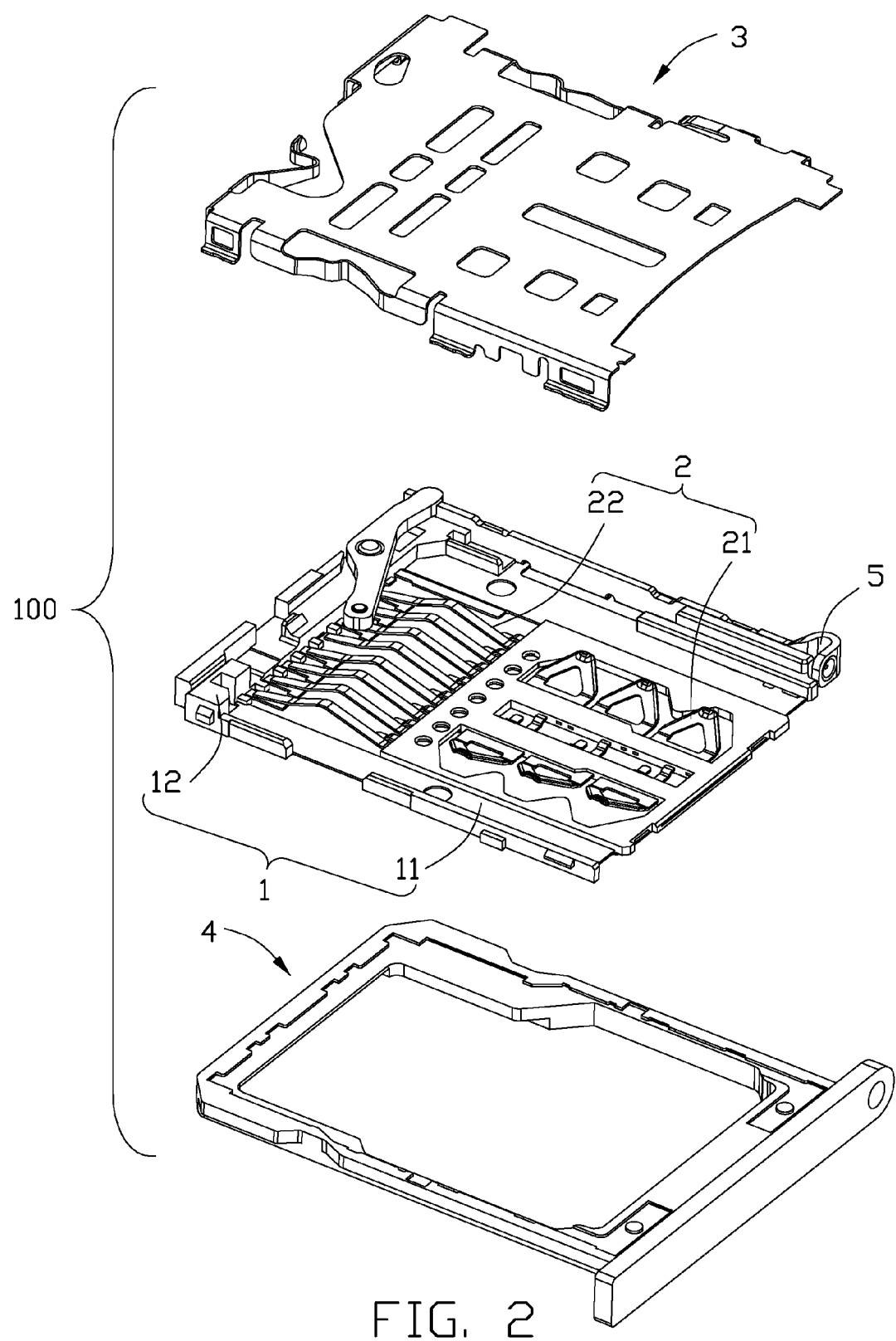
FIG. 2 is a perspective, exploded view of the electronic card connector in a first embodiment.
Figure 3:
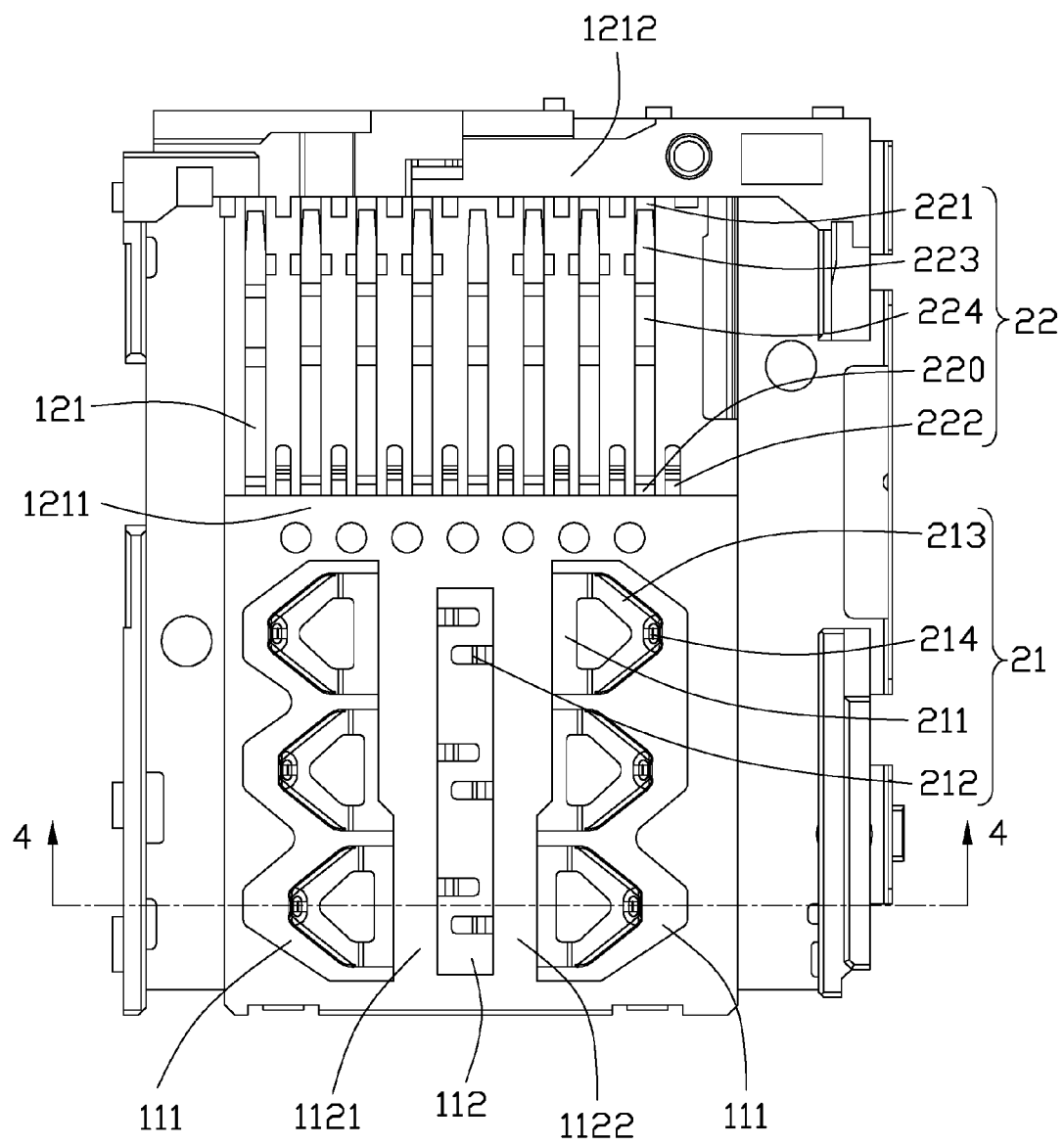
FIG. 3 is a top view of an insulative housing and a number of contacts of the electronic card connector in assembly in a first embodiment.

Referring to FIGS. 2 to 3, the insulative housing 1 includes a fore-end portion 11 and a back-end portion 12 relative to the fore-end portion 11. The fore-end portion 11 has a pair of first terminal-receiving slots or passageways 111 located at in two rows along the transverse direction and a number of depressions 112 located between the two rows of the first terminal-receiving slots 111. The fore-end portion 11 has a left wall 1121 and a right wall 1112 separating the first terminal-receiving slots 111 from the depression 112. The back-end portion 12 has a number of second terminal-receiving slots or passageways 121, a front wall 1211, and a rear wall 1212 opposite to the second terminal-receiving slots 121.

Referring to FIGS. 2-3, the terminals 2 include a number of first contacts 21 and second contacts 22 retained in the insulative housing 1 and located at the insertion direction. The number of the first contacts 21 is six and the first contacts 21 are disposed in two rows along the transverse direction and beside the depression 112. Each first contacts 21 extends in the transverse direction and the first contacts 21 in a same row extends in a contrary direction compared to first contacts 21 in the other row along the transverse direction. The first contacts 21 in a row along the insertion direction extend in a same direction. Each first contact 21 includes a first affixed portion 211 retained in the left wall 1121 or the right wall 1122, a first soldering portion 212 extending to the depression 112 from a free end of the first affixed portion 211, a first elastic portion 213 extending from a free end of the first affixed portion 211 to a space above the first terminal-receiving slots 111, and a first contacting portion 214 located at a peak of the first elastic portion 213. The number of the second contacts 22 is eight and the second contacts 22 are disposed in a row along the transverse direction. Each second contact 22 includes a second affixed portion 220 retained in the front wall 1211, a third affixed portion 221 retained in the rear wall 1212, a second soldering portion 222 extending to the second terminal-receiving slots 121 from a free end of the second affixed portion 220 or the third affixed portion 221, a second elastic portion 223 connected with the second affixed portion 220 and the third affixed portion 221, and a second contacting portion 224 located at a peak of the second elastic portion 223. The electronic card connector 100 optionally receives a micro SIM (Subscriber Identity Module) card contacted with the first contacts 21 or a micro SD card (Secure Digital) contacted with the second contacts 22.

Figure 4:
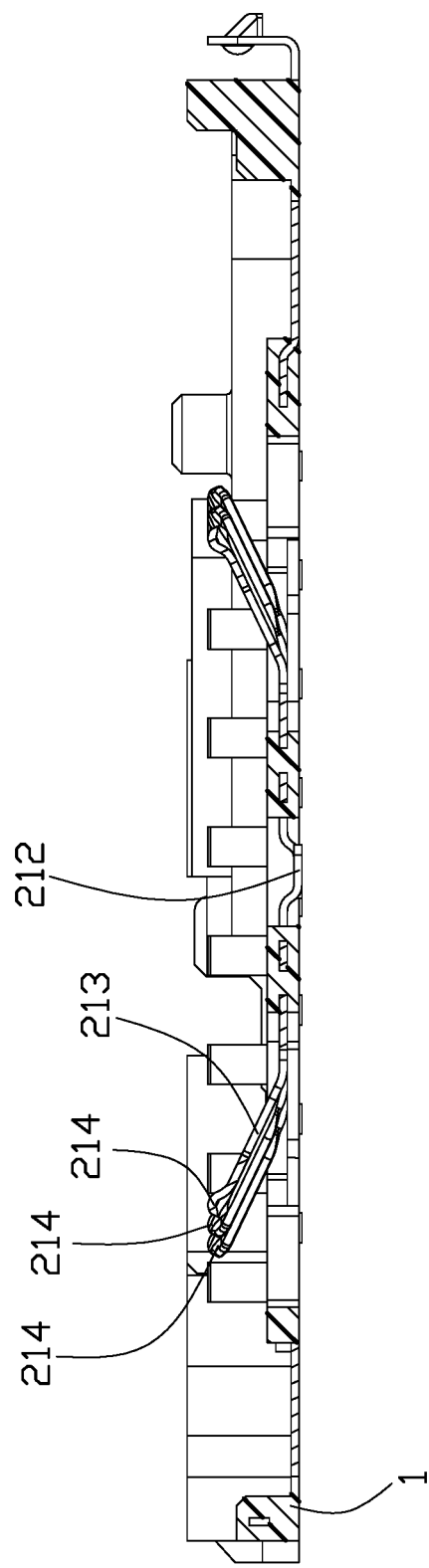
FIG. 4 is a cross-sectional view of the electronic card connector along line 4-4 in FIG. 3 in a first embodiment.

Referring to FIGS. 3 to 4, the first contacts 21 are mirror symmetry in the insertion direction in a prior embodiment and include three ones located at the left and three ones located at the right. The three first contacts 21 in the left are arranged in a line along the insertion direction and received in the first terminal-receiving slots 111 located at the left of the insulative housing 1, and the three first contacts 21 in the right are arranged in a line along the insertion direction and received in the first terminal-receiving slots 111 located at the right of the insulative housing 1. In other embodiment, the electronic card connector 100 includes at least three first contacts 21 located in a line along the insertion direction. The first contacting portion 214 of any of the three first contacts 21 is offset in the insertion direction relative to the first contacting portion 214 of the other ones of the first contacts 21. The first contacting portions 214 and the corresponding first affixed portions 211 define transverse directions L1, L2, L3 in the insertion direction therebetween, and L1<L2<L3 to ensure the first contacts 21 except the one corresponding to the conductive pad of the micro SIM card 6 to damage for wrongly scuffing. In a preferred embodiment, distances between the first contacting portion 214 in the middle of the three first contacts 21 and the first contacting portion 214 of the other first contacts 21 are the same and define L4, and L4=L3−L2=L2−L1. In a preferred embodiment, L4≥0.2 mm.

Figure 5:
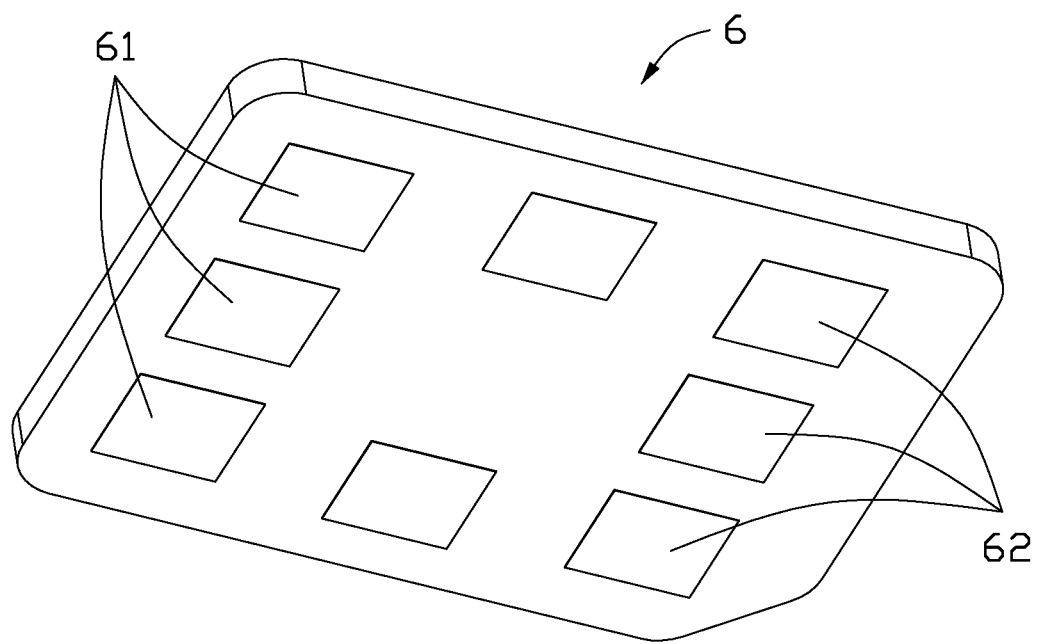
FIG. 5 is a perspective view showing a Micro SIM card received in the electronic card connector in a first embodiment.
Figure 6:
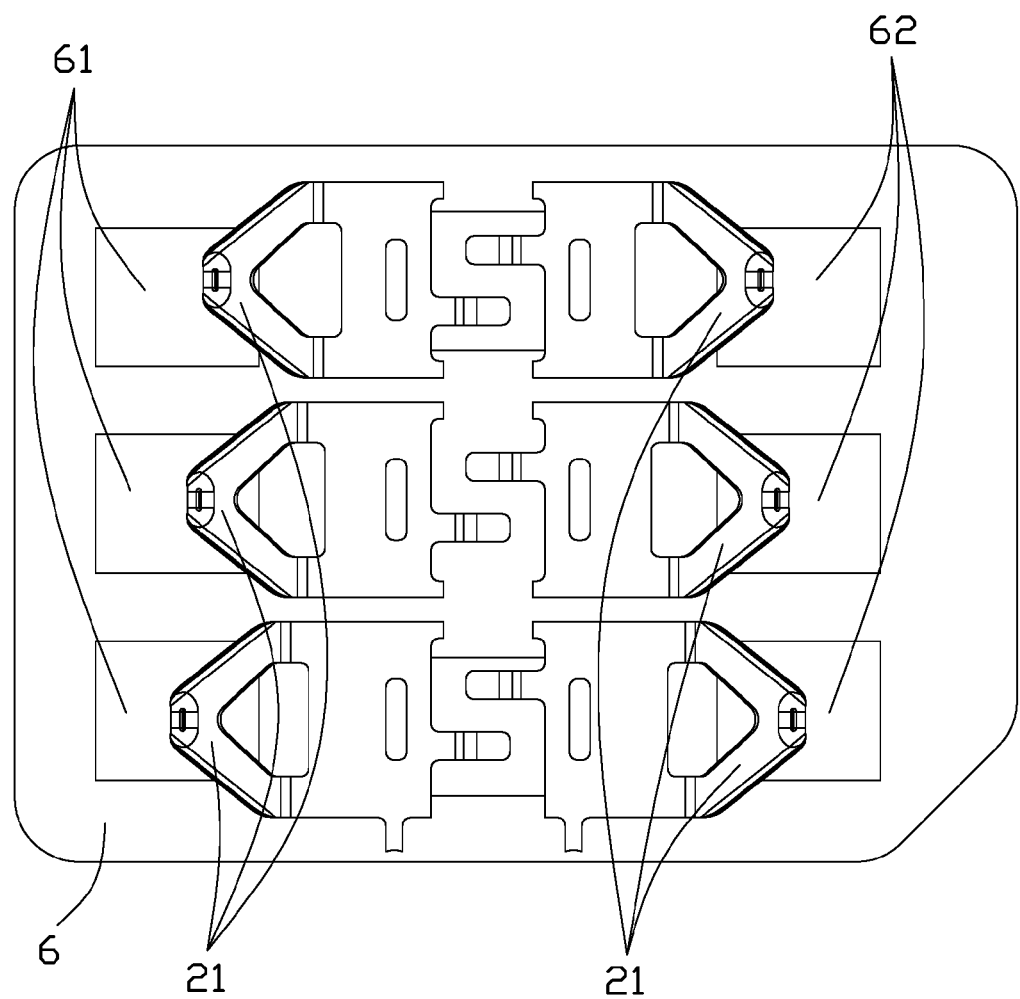
FIG. 6 is a bottom view of a number of first contacts cooperated with the Micro SIM card in a first embodiment.

Referring to FIGS. 5-6, the micro SIM card 6 includes first conductive pads 61 corresponding to first contacts 21 in the left and second conductive pads 62 corresponding to first contacts 21 in the right. The first conductive pads 61 extend in a first line along the insertion direction, the second conductive pads 62 extend in a second line along the insertion direction, and the first line and the second line are parallel. Any of the first conductive pads 61 and the second conductive pads 62 defines a width in the transverse direction to ensure the first contacts 21 in the left to contact with the first conductive pads 61 and avoid the first conductive pads 61 and the second conductive pads 62 located at the front along the insertion direction to repeat stressing.

Figure 7:
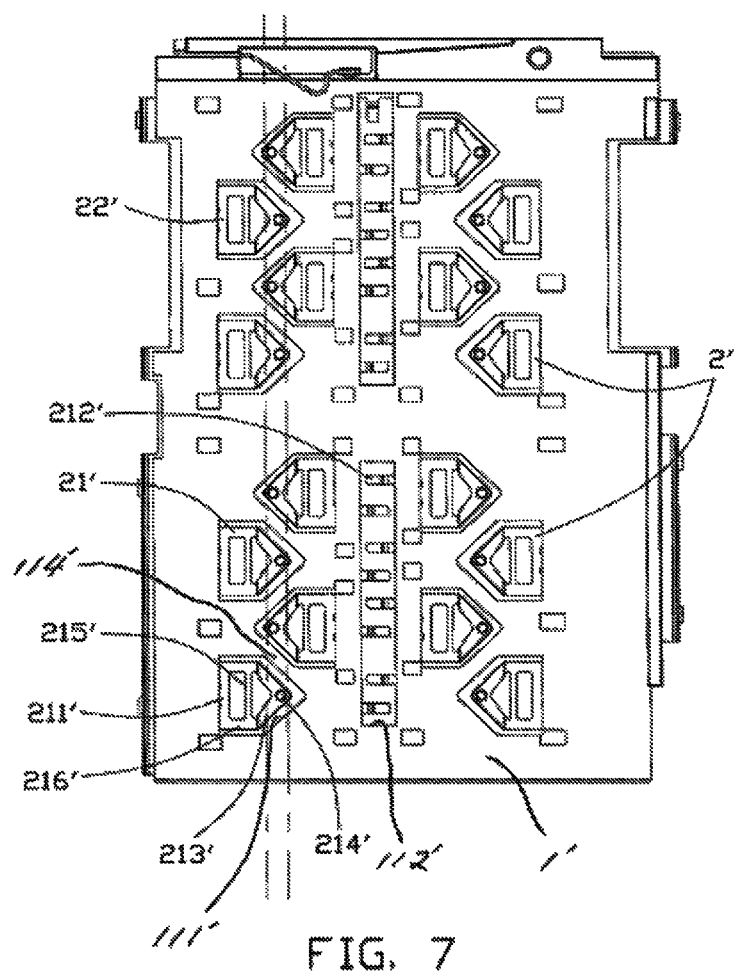
FIG. 7 is a top view of electronic card connector without the metal shell in a second embodiment.

Referring to FIG. 7, an electronic card connector 100 in a second embodiment of the present invention is roughly same as the electronic card connector 100 in the first embodiment except the terminals 2'. The terminals 2' include a number of first contacts 21' and second contacts 22' located in the insertion direction. The number of the first contacts 21' and the second contacts 22' are both eight and the first contacts 21' and the second contacts 22' are same as each other. The first contacts 21' are located in two rows and each first contact 21' includes a first retaining section or affixed portion 211' embedded within housing 1', a first tail section or soldering portion 212' extending from a free end of the first affixed portion 211', a pair of first elastic portions 213' extending upwardly, a first contacting portion 214' located at a peak of the first elastic portions 213', a first connecting portion 215' connected the two first elastic portions 213', and a pair of first frame portions 216' disposed parallel and connected with free ends of the first affixed portion 211' and the first connecting portion 215' in the same side. The first elastic portions 213' are resiliently deformable in an up-and-down direction. The first connecting portion 215' plays an important role in stability so that an excessive drop of elastic deformation quantity of the first elastic portions 213' due to unequal pressure is reduced to avoid a plastic deformation of the first elastic portions 213'. The neighboring terminals 2' in a row along the insertion direction located along the card-inserting direction extend in a contrary direction to shorten the length of the electronic card connector 100. The neighboring first contacting portions 214' in a row along the insertion direction are offset in the transverse direction. The first frame portions 216' together with the first connecting portion 215' and the first affixed portion 211' form a rectangle.

In essence, in FIG. 7 each contact forms a home plate configuration with a triangular section and a rectangular section, and the housing 1' forms a plurality of passageways 111' each having a similar home plate configuration with a corresponding triangular section and a rectangular section to accommodate the corresponding contact compliantly. To arrange the contacts densely, the housing is divided into two opposite zones in the transverse direction by an opening 112' which is located in the centerline and in which the tail sections of all contacts are exposed. The contacts/passageways are arranged in two rows in each zone along the front-to-back direction. The passageways in two rows are directed toward each other with the corresponding triangular sections and alternately arranged with each other along the front-to-back direction wherein the triangular sections of one row of passageways are overlapped with those of the other row of passageways in the front-to-back direction. On one hand, the dimension of the two rows of the passageways is essentially one half of each passageway in the transverse direction; one the other hand, the distance between the two adjacent passageways in the front-to-back direction is less than a dimension of the rectangular section in the front-to-back direction. Therefore, the two rows of passageways may be densely arranged with each other in both the transverse direction and the front-to-back direction.

Figure 8:
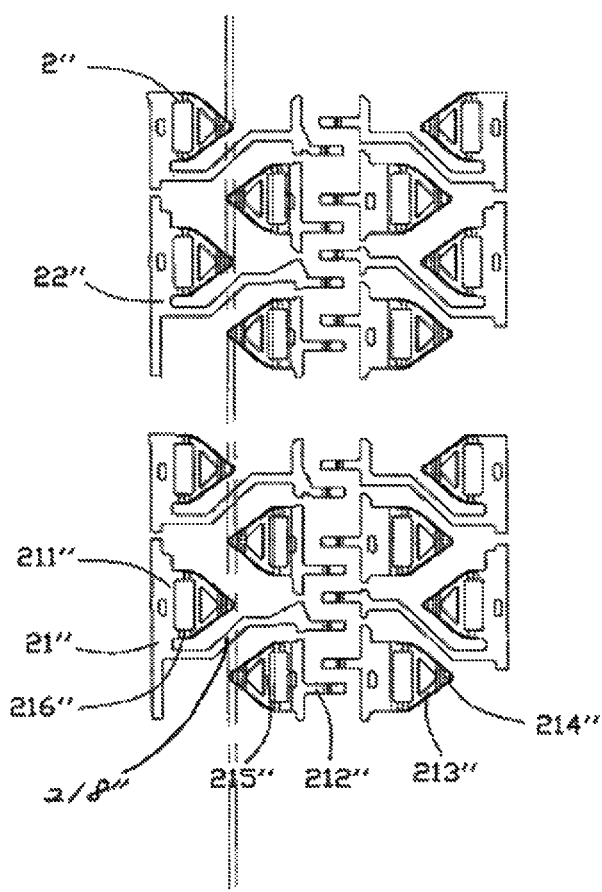
FIG. 8 is a top view of the terminals in a third embodiment.

Referring to FIG. 8, an electronic card connector 100 in a third embodiment of the present invention is roughly same as the electronic card connector 100 in the first embodiment except the terminals 2". The terminals 2" include a number of first contacts 21" and second contacts 22" located in the insertion direction. The number of the first contacts 21" and the second contacts 22" are both eight and the first contacts 21" and the second contacts 22" are same as each other. The first contacts 21" are located in two rows and each first contact 21" includes a first retaining section or affixed portion 211", a first tail section or soldering portion 212" extending from a free end of the first affixed portion 211", a pair of first elastic portions 213" extending upwardly, a first contacting portion 214" located at a peak of the first elastic portions 213", a first connecting portion 215" connected the two first elastic portions 213", and a pair of first frame portions 216" disposed parallel and connected with free ends of the first affixed portion 211" and the first connecting portion 215" in the same side. The neighboring terminals 2" in a row along the insertion direction located along the card-inserting direction extend in a contrary direction to shorten the length of the electronic card connector 100. The neighboring first contacting portions 214" in a row along the insertion direction are offset in the transverse direction. As shown in FIG. 7, a respective strap region 114' of the housing 1' is formed between the triangular section of one of the first row of passageways 111' and the triangular section of a corresponding one of the second row of passageways 111'. As measured in the front-to-back direction, the strap region is dimensioned to be smaller than the rectangular section of the passageway 111'. Notably, all the tail sections/soldering portions are exposed in the opening 112' located at the centerline. Of a contact located in the outer row passageway, an extension section 218" between the affixed portion 211" and the corresponding soldering portion 212", extends along the strap region 114' between the neighboring triangular sections of the corresponding two neighboring passageways in a parallel relationship. Understandably, the two neighboring triangular sections of the passageways in two rows are expected to be as close as possible to each other while still requiring keeping the sufficient space to allow such an extension section to extend therebetween.

While a preferred embodiment in accordance with the present invention has been shown and described, equivalent modifications and changes known to persons skilled in the art according to the spirit of the present invention are considered within the scope of the present invention as described in the appended claims.

What is claimed is:

1. An electronic card connector assembly, defining opposite insertion direction and ejection direction, and a transverse direction perpendicular to both the insertion direction and ejection direction, comprising:
    a plurality of terminals including a row of first contacts disposed along the insertion direction, each first contact having a first affixed portion and a first contacting portion located at a peak therein, each of the first contacts extending along the transverse direction, the first contacting portions of the neighboring first contacts being not aligned with each other but in an offset manner along the insertion direction, the first contacting portions and associated first affixed portions of the first contacts being distanced differently in the transverse direction.

2. The electronic card connector assembly as claimed in claim 1, wherein the first affixed portions of the first contacts in a row are arranged in a line along the insertion direction.

3. The electronic card connector assembly as claimed in claim 2, wherein the first contacts have same sizes along the transverse direction, and the first contacting portions located in the insertion direction are offset laterally one by one.

4. The electronic card connector assembly as claimed in claim 1, wherein the plurality of terminals comprise another row of first contacts, the two rows being arranged mirror symmetry with respect to the insertion direction.

5. The electronic card connector assembly as claimed in claim 1, further including an insulative housing in which the terminals are retained.

6. The electronic card connector assembly as claimed in claim 5, further including an electronic card for receipt within the housing, wherein said card has a plurality of first conductive pads located in a line along the insertion direction, each first conductive pad defining a same width in the transverse direction.

7. The electronic card connector assembly as claimed in claim 5, wherein an amount of said first contacts is at least three, said first contacts are arranged with an outermost first contact located closest to a front opening of the housing, an inner most first contact located farthest from the front opening, and a middle first contact located between said outermost first contact and said innermost first contact, and the first contacting portions of all said first contacts are arranged in a sequentially offset manner from the outermost first contact to the innermost first contact.

8. The electronic card connector assembly as claimed in claim 7, wherein the housing defines a centerline along the insertion direction, and the first contacting portion of the outermost first contact is closest to the centerline while the first contacting portion of the innermost first contact is farthest from the centerline.

9. The electronic card connector assembly as claimed in claim 7, wherein a distance, in the transverse direction, between the first contacting portion and the first affixed portion of the outermost first contact is smaller than that of the innermost first contact.

10. The electronic card connector assembly as claimed in claim 1, wherein all said first contacts are arranged in a same orientation in the same transverse direction.

11. An electronic card connector assembly comprising:
    an insulative housing;
    first and second rows of passageways formed within the housing along a front-to-back direction and opposite to each other in a transverse direction perpendicular to said front-to-back direction, the first row of passageways and the second row of passageways being alternately arranged with each other in said front-to-back direction, each of said first and second rows of passageways being dimensionally and structurally similar to one another and defining a home plate configuration with a triangular section and a rectangular section, the triangular sections of all said first row of passageways directed toward the second row of passageways, the triangular sections of all said second row of passageways directed toward the first row of passageway; and
    first and second rows of contacts disposed in the corresponding first and second rows of passageways, respectively, each of said first and second rows of contacts defining a home plate contour compliantly received within and further extending away from the corresponding passageway in a vertical direction perpendicular to both said front-to-back direction and said transverse direction; wherein
    a distance between a first line defined by an outermost region of each of the first row of passageways away from the second row of passageways in the transverse direction, and another outermost region of each of the second row of passageways from the first row of passageway in the transverse direction, is generally one and half of a largest dimension of each passageway in the transverse direction.

12. The electronic card connector assembly as claimed in claim 11, wherein the triangular sections of the first row of passageways and the triangular sections of the second row of passageways are overlapped with each other in the front-to-back direction, and a peak of the triangular section of each of the first row of passageways extends beyond a joined region between the triangular section and the corresponding rectangular section of the corresponding one of said second row of passageways in the transverse direction, and a peak of the triangular section of each of the second row of passageways extends beyond a joined region between the triangular section and the corresponding rectangular section of the corresponding one of said first row of passageways in the transverse direction, so as to achieve a dense arrangement between the first row of passageways and second row of passageways in the transverse direction.

13. The electronic card connector assembly as claimed in claim 11, wherein a strap region of the housing between the triangular section of one of the first row of passageways and the triangular section of the corresponding one of the second row of passageways is dimensioned in the front-to-back direction to be smaller than the rectangular section of each of said first and second rows of passageways in said front-to-back direction.

14. The electronic card connector assembly as claimed in claim 13, wherein each of the first row of contacts has a retaining section embedded within the housing, and an extension section extending from the retaining section along said strap region with a tail section which is located at a distant end of the retaining section and exposed in an opening of the housing which is located by another side of the second row of passageways opposite to the first row of passageways in the transverse direction.

15. The electronic card connector assembly as claimed in claim 14, wherein each of said second row of contacts includes a tail section exposed within said opening beside the tail section of the corresponding one of said first row of passageways in the front-to-back direction.

16. The electronic card connector assembly as claimed in claim 11, wherein a distance between the two neighboring passageways in the same row is smaller than a largest dimension of each passageway in the front-to-back direction so as to have a dense arrangement of the passageways not only along the same row but also between the two opposite first and second rows.

17. An electronic card connector assembly comprising:
an insulative housing;
an elongated opening formed with the housing along a front-to-back direction;
first and second rows of passageways formed within the housing along said front-to-back direction and opposite to each other in a transverse direction perpendicular to said front-to-back direction, the first row of passageways and the second row of passageways being alternately arranged with each other in said front-to-back direction, each of said first and second rows of passageways being dimensionally and structurally similar to one another and defining a home plate configuration with a triangular section and a rectangular section, the triangular sections of all said first row of passageways directed toward the second row of passageways, the triangular sections of all said second row of passageways directed toward the first row of passageway; and
first and second rows of contacts disposed in the corresponding first and second rows of passageways, respectively, each of said first and second rows of contacts defining a home plate contour compliantly received within and further extending away from the corresponding passageway in a vertical direction perpendicular to both said front-to-back direction and said transverse direction; wherein
said second row of passageways is located between the elongated opening and the first row of passageways in the transverse direction; wherein
a strap region of the housing is formed between the triangular section of one of the first row of passageways and the triangular section of the corresponding one of the second row of passageways; wherein
each of the first row of contacts has a retaining section embedded within the housing, and an extension section extending from the retaining section along said strap region with a tail section which is located at a distant end of the retaining section and exposed in the elongated opening of the housing which is located by another side of the second row of passageways opposite to the first row of passageways in the transverse direction.

18. The electronic card connector assembly as claimed in claim 17, wherein said extension section extends between and in parallel with the triangular section of one of the first row of passageways and the triangular section of the corresponding one of the second row of passageways.

19. The electronic card connector assembly as claimed in claim 17, wherein said opening is located at a centerline of the housing in said front-to-back direction so as to form opposite first and second zones of the housing in the transverse direction, said first and second rows of passageways and the corresponding first and second rows of contacts are all located in the first zone, and the second zone is equipped with third and fourth rows of passageways and third and fourth rows of corresponding contacts in the corresponding third and fourth rows of passageways so as to be symmetrically arranged with the first and second rows of passageways and the corresponding first and second rows of contacts therein with regard to the opening, view along the front-to-back direction.

20. The electronic card connector assembly as claimed in claim 19, wherein the tail sections of the third and fourth rows of contacts are also exposed in the opening, and alternately arranged with the tail sections of the first and second rows of contacts along the front-to-back direction in a generally aligned manner.

\* \* \* \* \*